United States Patent
Lee et al.

(10) Patent No.: US 8,856,596 B2
(45) Date of Patent: Oct. 7, 2014

(54) DEBUGGING APPARATUS AND METHOD

(75) Inventors: Jin-Seok Lee, Seoul (KR); Bernhard Egger, Seoul (KR); Dong-Hoon Yoo, Seoul (KR); Tai-Song Jin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 581 days.

(21) Appl. No.: 13/079,275

(22) Filed: Apr. 4, 2011

(65) Prior Publication Data

US 2012/0089821 A1 Apr. 12, 2012

(30) Foreign Application Priority Data

Oct. 8, 2010 (KR) .................. 10-2010-0098404

(51) Int. Cl.
*G06F 11/00* (2006.01)
*G06F 9/30* (2006.01)
*G06F 11/36* (2006.01)

(52) U.S. Cl.
CPC ........ *G06F 9/30076* (2013.01); *G06F 11/3644* (2013.01)
USPC ........................ 714/35; 714/38.13; 714/38.1

(58) Field of Classification Search
CPC ................ G06F 11/3664; G06F 11/3636
USPC ................................. 714/35, 38.13
See application file for complete search history.

(56) References Cited

U.S. PATENT DOCUMENTS

| | | | |
|---|---|---|---|
| 6,862,694 B1 | 3/2005 | Tormey et al. | |
| 6,934,937 B1* | 8/2005 | Johnson et al. | 717/129 |
| 7,506,205 B2 | 3/2009 | Pedersen et al. | |
| 7,543,186 B2 | 6/2009 | Schultz | |
| 7,574,585 B1 | 8/2009 | Nekl et al. | |
| 2007/0011431 A1 | 1/2007 | Hogdal et al. | |
| 2008/0010536 A1* | 1/2008 | Bates et al. | 714/38 |

FOREIGN PATENT DOCUMENTS

| | | |
|---|---|---|
| KR | 10-2000-0045665 | 7/2000 |
| KR | 10-2003-0088523 | 11/2003 |

* cited by examiner

*Primary Examiner* — Sarai Butler
(74) *Attorney, Agent, or Firm* — NSIP Law (57) ABSTRACT

A debugging apparatus and method are provided. The debugging apparatus may include a breakpoint setting unit configured to store a first instruction corresponding to a breakpoint in a table, stop a program currently being executed, and insert a breakpoint instruction including current location information of the first instruction into the breakpoint; and an instruction execution unit configured to selectively execute one of the breakpoint instruction and the first instruction according to a value of a status bit.

20 Claims, 7 Drawing Sheets

DEBUGGING APPARATUS AND METHOD

CROSS-REFERENCE TO RELATED APPLICATION(S)

This application claims the benefit under 35 U.S.C. §119(a) of Korean Patent Application No. 10-2010-0098404, filed on Oct. 8, 2010, in the Korean Intellectual Property Office, the entire disclosure of which is incorporated herein by reference for all purposes.

BACKGROUND

1. Field

The following description relates to a debugging apparatus and method for stopping a program currently being executed and debugging the program.

2. Description of the Related Art

A breakpoint is an intentional stopping or pausing place in a program, put in place for debugging purposes. In order to debug a program, the program must be stopped even in the middle of being executed. The suspension of a program currently being executed may be performed by setting a breakpoint in a particular part of the program code. The setting of a breakpoint may be performed using either a hardware-based method or a software-based method.

The hardware-based method is characterized by providing a limited number of registers in a system at the time of the design of the system and inserting an instruction address, which is the address of an instruction where the execution of a program is stopped, in the registers, so that the program can stop when then the registers and a program counter hit the same value. As an example, the x86 instruction set architecture provides hardware support for breakpoints with its x86 debug registers. However, since the number of registers installed in the system is limited, there is a limit in setting multiple breakpoints using the hardware-based method.

The software-based method is characterized by inserting, during the execution of a program, an instruction that stops the program into the program to set a breakpoint. The program is stopped when encountering the instruction, and the system is switched to a debugging mode. However, when the system is switched back to a normal mode, a face breakpoint may be set in the system, and thus, the performance of the system may deteriorate due to memory read/write operations. That is, in order to resume the program, an operation originally at the address of the instruction needs to be restored, and the setting of the breakpoint needs to be maintained. Thus, a fake breakpoint is set in the next instruction. Thereafter, when the system is switched back to the debugging mode at the fake breakpoint, the original breakpoint is reset, and the fake breakpoint is deleted. As a result, debugging is performed twice. Also, implementing data breakpoints in software can greatly reduce the performance of the Application being debugged, as it is using additional resources on the same physical processor.

SUMMARY

In one general aspect, there is provided a debugging apparatus, including: a breakpoint setting unit configured to store a first instruction corresponding to a breakpoint in a table and insert a breakpoint instruction into the breakpoint, the breakpoint instruction configured to stop a program currently being executed and including current location information of the first instruction, and an instruction execution unit configured to selectively execute one of the breakpoint instruction and the first instruction, according to a value of a status bit.

In the debugging apparatus, the breakpoint setting unit may be further configured to: store the first instruction in a first entry of the table, and store a second instruction, which is to be executed after the execution of the first instruction, in a second entry of the table.

In the debugging apparatus, the instruction execution unit may be further configured to: execute the first instruction in the table, and subsequently return an execution order to the second instruction, after the execution of the first instruction, with reference to the second entry.

In the debugging apparatus, the instruction execution unit may be further configured to: execute the breakpoint instruction, and in response to the execution of the breakpoint instruction, switch the status bit to a second state, in response to the status bit being placed in a first state.

In the debugging apparatus, the instruction execution unit may be further configured to: execute the first instruction, and in response to the execution of the first instruction, switch the status bit to the first state, in response to the status bit being placed in the second state.

In the debugging apparatus, the instruction execution unit may include: a program counter configured to store an execution location of the program, a bit register configured to store the status bit therein, and a controller configured to: maintain a value of the program counter, or change the value of the program counter to indicate the first instruction in the table, in response to the value of the program counter reaching an address of the breakpoint.

In the debugging apparatus, the controller may be further configured to change the status bit after the changing of the value of the program counter, to indicate the first instruction in the table.

In another general aspect, there is provided a debugging apparatus, including: a breakpoint setting unit configured to store a first instruction corresponding to a breakpoint in a table and insert a breakpoint instruction into the breakpoint, the breakpoint instruction configured to stop a program currently being executed and including current location information of the first instruction, a program counter configured to store an execution location of the program, a bit register configured to store a status bit therein, and a controller configured to: maintain the program counter to allow the breakpoint instruction to be executed and subsequently switch the status bit to a second state, in response to the execution of the breakpoint instruction, in response to the status bit being placed in a first state, in response to the program counter pointing to the breakpoint, and change the program counter to point to the location of the first instruction to allow the first instruction to be executed and subsequently switch the status bit to the first state, in response to the execution of the first instruction, in response to the status bit being placed in the second state, in response to the program counter pointing to the breakpoint.

In the debugging apparatus, the breakpoint setting unit may be further configured to store the first instruction and a second instruction together in the table, the second instruction to be executed after the execution of the first instruction.

In the debugging apparatus, the controller may be further configured to change the value of the program counter to indicate the second instruction, after the execution of the first instruction.

In another general aspect, there is provided a debugging method, including: storing a first instruction corresponding to a breakpoint in a table and inserting a breakpoint instruction into the breakpoint, the breakpoint instruction stopping a program currently being executed and including current location information of the first instruction, in response to a status bit being placed in a first state, in response to a program counter pointing to the breakpoint: switching the status bit to a second state, maintaining the program counter, and executing the breakpoint instruction, and in response to the status bit being placed in the second state, in response to the program counter pointing to the breakpoint: switching the status bit to the first state, changing the program counter to point to the location of the first instruction, and executing the first instruction.

In the debugging method, inserting the breakpoint instruction may include storing the first instruction and a second instruction together in the table, second instruction to be executed after the execution of the first instruction.

In another general aspect, there is provided a debugging method, including: setting a breakpoint in a program, in response to the breakpoint being encountered during the execution of the program, determining whether a status bit is placed in a first state, in response to it being determined that the status bit is placed in the first state: switching the status bit to a second state, executing the breakpoint instruction, and performing debugging of the program.

The debugging method may further include: in response to the debugging of the program being complete: resuming the program, and determining whether the status bit is placed in the first state.

The debugging method may further include: in response to it being determined that the status bit is not placed in the first state: switching the status bit to the first state, executing the first instruction, and executing the second instruction.

In another general aspect, there is provided a debugging apparatus, including: a breakpoint setting unit configured to set a breakpoint in a program, an instruction execution unit configured to: in response to the breakpoint being encountered during the execution of the program, determine whether a status bit is placed in a first state, and in response to it being determined that the status bit is placed in the first state: switch the status bit to a second state, execute the breakpoint instruction, and perform debugging of the program.

In the debugging apparatus, in response to the debugging of the program being complete, the instruction execution unit may be further configured to: resume the program, and determine whether the status bit is placed in the first state.

In the debugging apparatus, in response to it being determined that the status bit is not placed in the first state, the instruction execution unit may be further configured to: switch the status bit to the first state, execute the first instruction, and execute the second instruction.

A non-transitory computer-readable information storage medium storing a program for implementing the methods.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
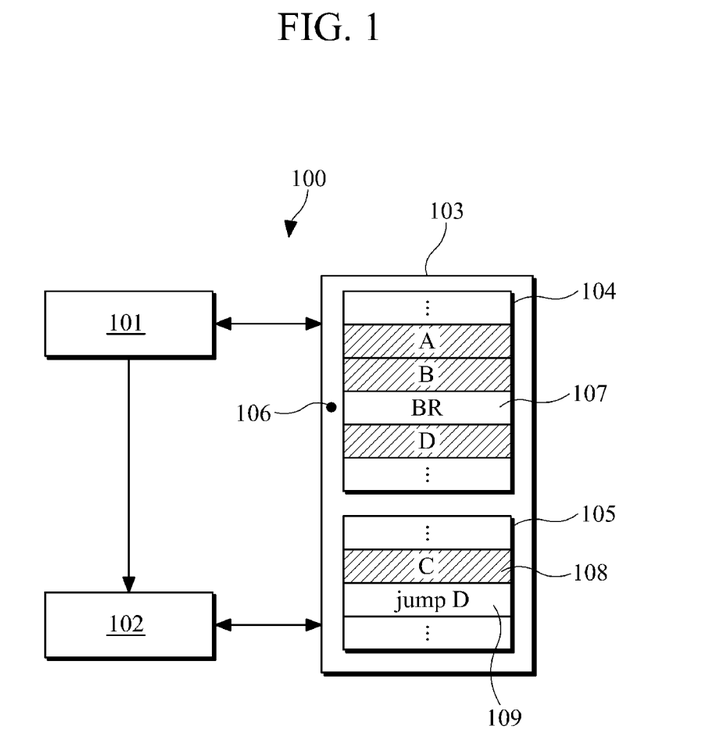
FIG. 1 is a diagram illustrating an example of a debugging apparatus.

FIG. 1 illustrates an example of a debugging apparatus.

Referring to FIG. 1, a debugging apparatus 100 may set a breakpoint in a particular part of a program to be debugged, and may debug the program at the breakpoint. For example, the debugging apparatus 100 may stop the program at the breakpoint, may acquire a system access right, and may examine the state of the execution of the program or the state of a system. The debugging apparatus 100 may include a breakpoint setting unit 101, an instruction execution unit 102, and a memory unit 103.

The memory unit 103 may be divided into a first memory area 104 and a second memory area 105. The program and a breakpoint instruction 107 for stopping the program may be stored in the first memory area 104. An instruction 108 originally in the place of the breakpoint instruction 107 and a jump instruction 109 (i.e., jump D) for jumping to an instruction (i.e., instruction D), to be executed after the execution of the instruction 108, may be stored in the second memory area 105.

The breakpoint setting unit 101 may set a breakpoint 106 in the program.

The breakpoint setting unit 101 may move an instruction at the breakpoint 106, e.g., the instruction 108, from the first memory area 104 to the second memory area 105, and may insert the breakpoint instruction 107 into the breakpoint 106. The breakpoint instruction 107 may stop the execution of the program. Current location information of the instruction 108, for example, the address of the instruction 108 in the second memory area 105, may be included in a particular field of the breakpoint instruction 107.

The breakpoint setting unit 101 may store the instruction 108 in a first entry of the second memory area 105, and may store an address of the instruction to be executed after the execution of the instruction 108, i.e., instruction D, in a second entry of the second memory area 105 below the instruction 108. The breakpoint setting unit 101 may also store the jump instruction 109, which may be an instruction to jump from the instruction 108 to instruction D in response to the program being resumed.

In response to the breakpoint 106 being encountered during the execution of the program, the instruction execution unit 102 may selectively execute one of the breakpoint instruction 107 and the instruction 108 according to the value of a status bit.

The status bit may be stored in a bit register. The status bit may be placed in a first or second state or may have a value of 0 or 1. The status bit may be initially set to a default value of, for example, 0. The value of the status bit may automatically change after the execution of one of the breakpoint instruction 107 and the instruction 108 by the instruction execution unit 102.

For example, in response to the status bit having a value of 0, the instruction execution unit 102 may execute the breakpoint instruction 107. As a result, the program may be stopped, and the state of the program or the system may be examined in a debugging mode. Then, the status bit may be set to 1. For example, the instruction execution unit 102 may set the status bit to 1 during the debugging mode.

On the other hand, in response to the status bit having a value of 1, the instruction execution unit 102 may execute the instruction 108. For example, in response to the debugging of the program being complete and thus the system being released from the debugging mode, the instruction execution unit 102 may execute the instruction 108 without executing the breakpoint instruction 107.

That is, the debugging apparatus 100 may insert the address of the instruction 108 in the second memory area 105 into the breakpoint instruction 107, and thus may allow a program counter to indicate the instruction 108 in the second memory area 105 in response to the system being released from the debugging mode. As a result, it may be possible to smoothly switch back to the normal mode by executing the instruction 108 originally at the breakpoint 106 and currently in the second memory area 105.

Figure 2:
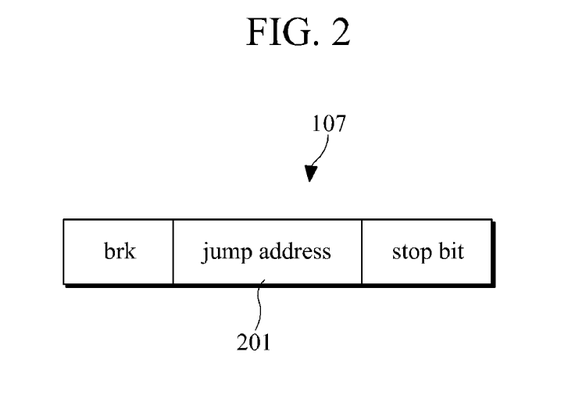
FIG. 2 is a diagram illustrating an example of a breakpoint instruction.

FIG. 2 illustrates an example of a breakpoint instruction.

Referring to FIGS. 1 and 2, the breakpoint instruction 107 may be inserted into the breakpoint 106 in the first memory area 104 of the memory unit 103 by the breakpoint setting unit 101. In response to the breakpoint instruction 107 being executed during the execution of a program, the program may be stopped, and the debugging of the program may be performed. The breakpoint instruction 107 may include an address field 201. The address field 201 may store the address of the instruction 108 originally in the place of the breakpoint instruction 107. For example, in response to the breakpoint 106 being set in the place of instruction C and thus instruction C being moved from the first memory area 104 to the second memory area 105, the address of instruction C in the second memory area 105 may be stored in the address field 201. The instruction execution unit 102 may selectively execute one of the breakpoint instruction 107 and the instruction 108. For example, the instruction execution unit 102 may reference the address field 201 of the breakpoint instruction 108 to execute the instruction 107.

Figure 3:
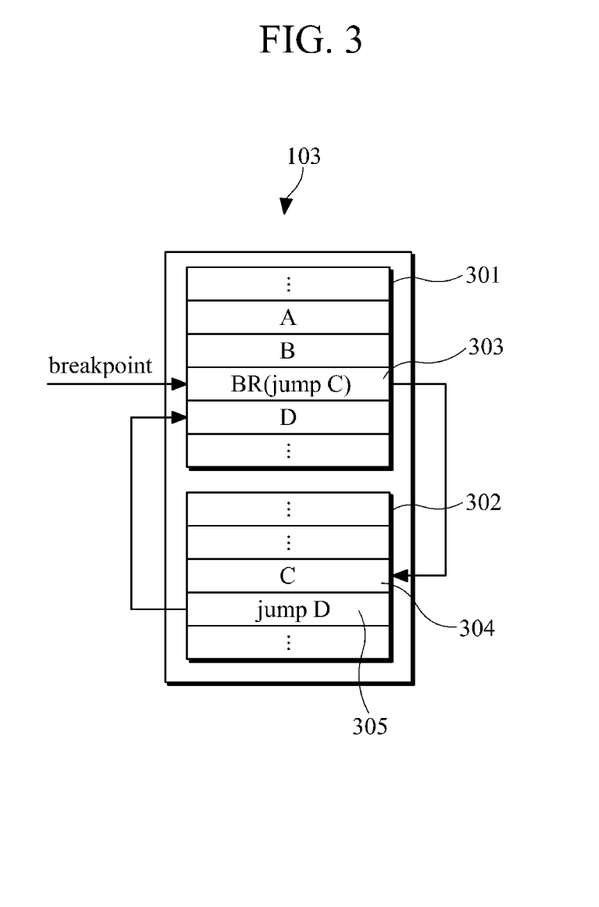
FIG. 3 is a diagram illustrating an example of a memory unit.

FIG. 3 illustrates an example of a memory unit.

Referring to FIG. 3, the memory unit 103 may include an instruction storage unit 301 and a table storage unit 302. The instruction storage unit 301 may store a plurality of instructions that constitute a program. A breakpoint may be set in the program simply by replacing one of the instructions, for example, an instruction 304, with a breakpoint instruction 303. The instruction 304 may be moved from the instruction storage unit 301 to the table storage unit 302, and may be stored in an entry of a table. In an entry next to the entry in which the instruction 304 is stored, a jump instruction 305 for jumping to an instruction (e.g., instruction D), to be executed after the execution of the instruction 304, may be stored.

Referring to FIG. 3, the instruction storage unit 301 and the table storage unit 302 may share the same physical space. Alternatively, the table storage unit 302 may account for part of the instruction storage unit 301, which may be used as an instruction memory. In one example, any instruction in the table storage unit 302 may be easily executed, simply by adjusting a program counter without the need to move the corresponding instruction from the table storage unit 302 to the instruction storage unit 301.

Figure 4:
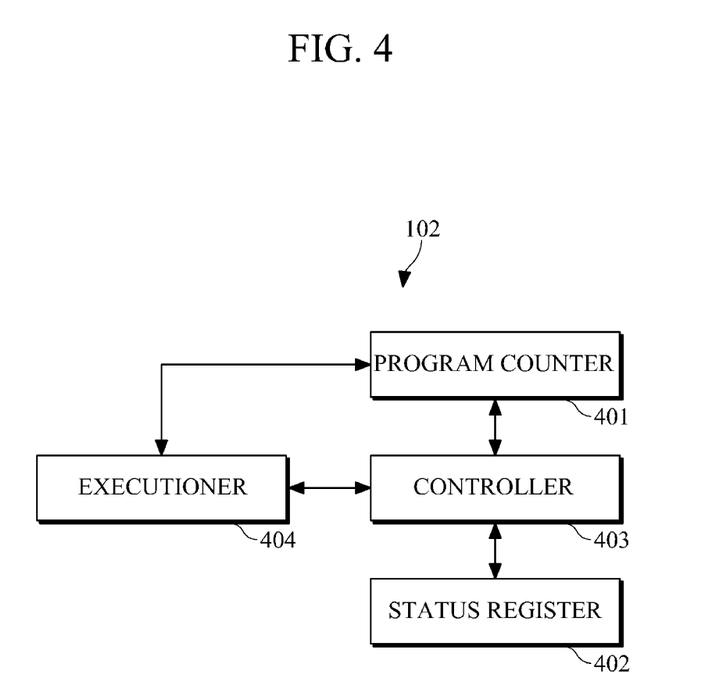
FIG. 4 is a diagram illustrating an example of an instruction execution unit.

FIG. 4 illustrates an example of an instruction execution unit.

Referring to FIGS. 3 and 4, the instruction execution unit 102 may include a program counter 401, a status register 402, a controller 403, and an executioner 404.

The program counter 401 may store an execution location of a program. For example, the execution location of the program may be the address of the next instruction to be executed. The executioner 404 may execute an instruction at the address indicated by the program counter 401. The value of the program counter 401 may be changed by the controller 403.

The bit register 402 may store a status bit. The status bit may have a value of 0 or 1. The bit register 402 may be initially set to one of the values of 0 and 1 as a default value, and the value of the bit register 402 may be changed from the default value by the controller 403.

In response to the value of the program counter 401 reaching the address of a breakpoint, the controller 403 may determine whether the value of the status register 402 has a value of 0 or 1. In response to the value of the status register 402 having a value of 0, the controller 403 may maintain the value of the program counter 401, may control the executioner 404 to execute an instruction at the address indicated by the program counter 401, i.e., the breakpoint instruction 303 in the instruction storage unit 301, and may set the status register 402 to 1.

On the other hand, in response to the value of the status register 402 having a value of 1, the controller 403 may set the program counter 401 to an address included in the breakpoint instruction 303, may control the executioner 404 to execute an instruction at the address included in the breakpoint instruction 303, i.e., the instruction 304 in the table storage unit 302, and may set the status register 402 to 0. Therefore, the executioner 404 may execute any instructions indicated by the program counter 401, including those included in the table storage unit 302.

FIGS. 5A through 5E illustrate an example of the operation of a debugging apparatus.

Figure 5A:
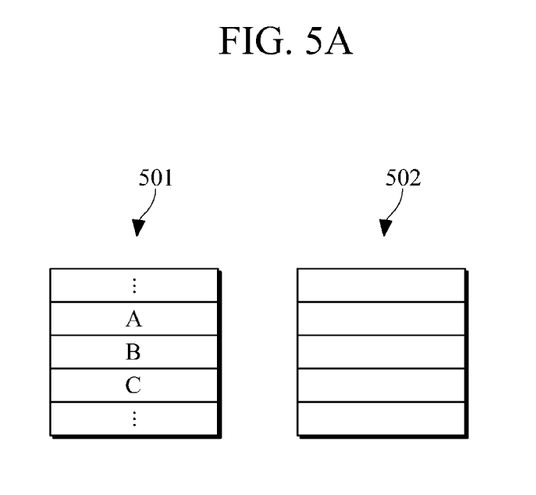
FIGS. 5A through 5E are diagrams illustrating an example of the operation of a debugging operation.

Referring to FIG. 5A, assume that a first memory area 501 is filled with a plurality of instructions (e.g., A, B, and C), that a second memory area 502 is empty, and that a breakpoint corresponds to instruction B.

Figure 5B:
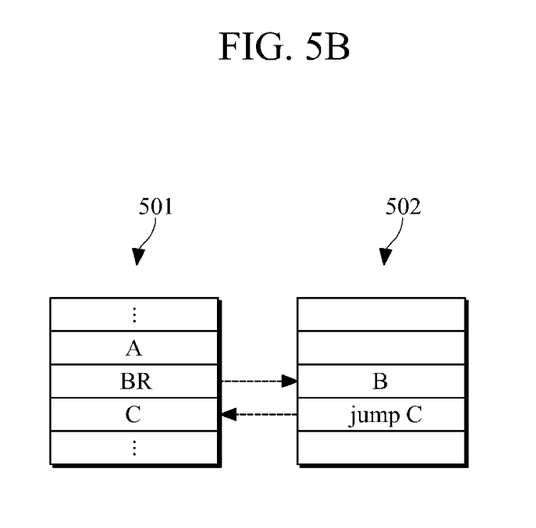

Referring to FIG. 5B, in response to the breakpoint being set in a program, a breakpoint instruction BR may be inserted into the place of instruction B in the first memory area 501, and instruction B may be moved to the second memory area 502. Breakpoint instruction BR has current location information of instruction B. Jump instruction "jump C" for jumping to instruction C after the execution of instruction B may be stored in the second memory area 502 below instruction B.

Figure 5C:
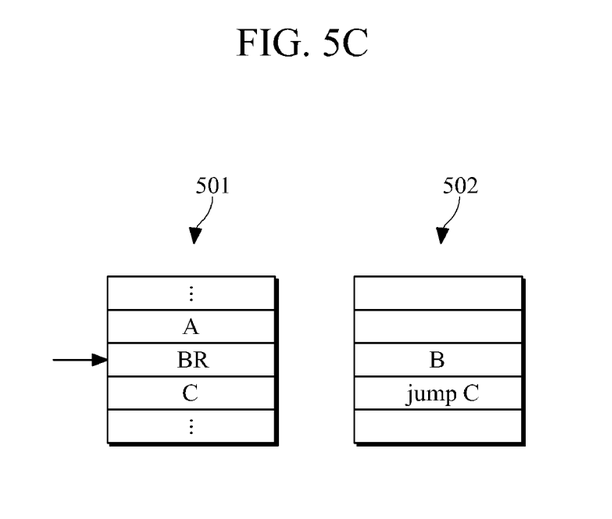

Referring to FIG. 5C, in response to the breakpoint being encountered during the is execution of the program, one of breakpoint instruction BR and instruction C may be selectively executed, according to the value of a status bit. For example, in response to the status bit having a default value of 0, the value of a program counter may be maintained, and thus, breakpoint instruction BR may be executed. As soon as the execution of breakpoint instruction BR begins, the status value may be set to 1. In response to breakpoint instruction BR being executed, the program may be stopped, and may then be debugged in a debugging mode. As the value of the program counter may not change until the system is switched back to a normal mode from the debugging mode, the value of the program counter may still indicate breakpoint instruction BR.

Figure 5D:
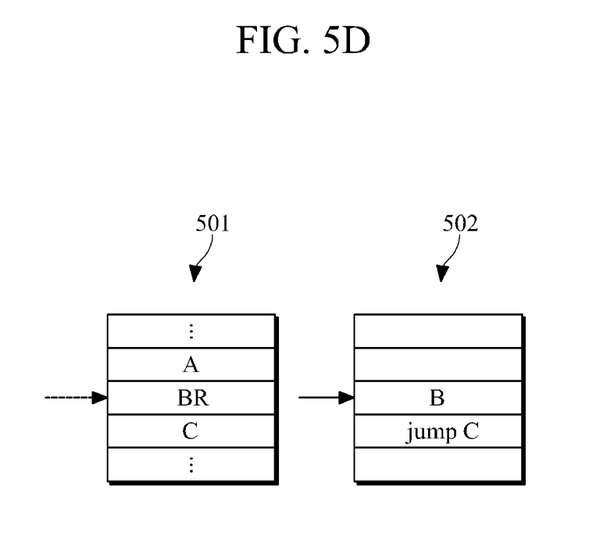

Referring to FIG. 5D, in response to the status bit having a value of 1, the value of the program counter may be changed, based on the address included in breakpoint instruction BR to indicate instruction B in the second memory area 502. Then, the status bit may be set back to 0. As a result, instruction B in the second memory area 502 may be executed as soon as the system is switched back to the normal mode.

Figure 5E:
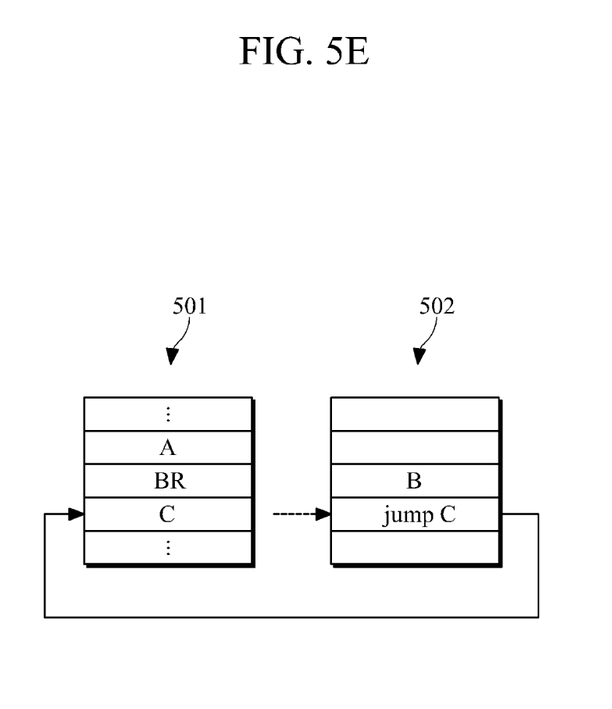

Referring to FIG. 5E, after the execution of instruction B in the second memory area 502, the value of the program counter may be changed to indicate instruction C due to jump instruction jump C, and thus, the execution of instruction C may begin.

Figure 6:
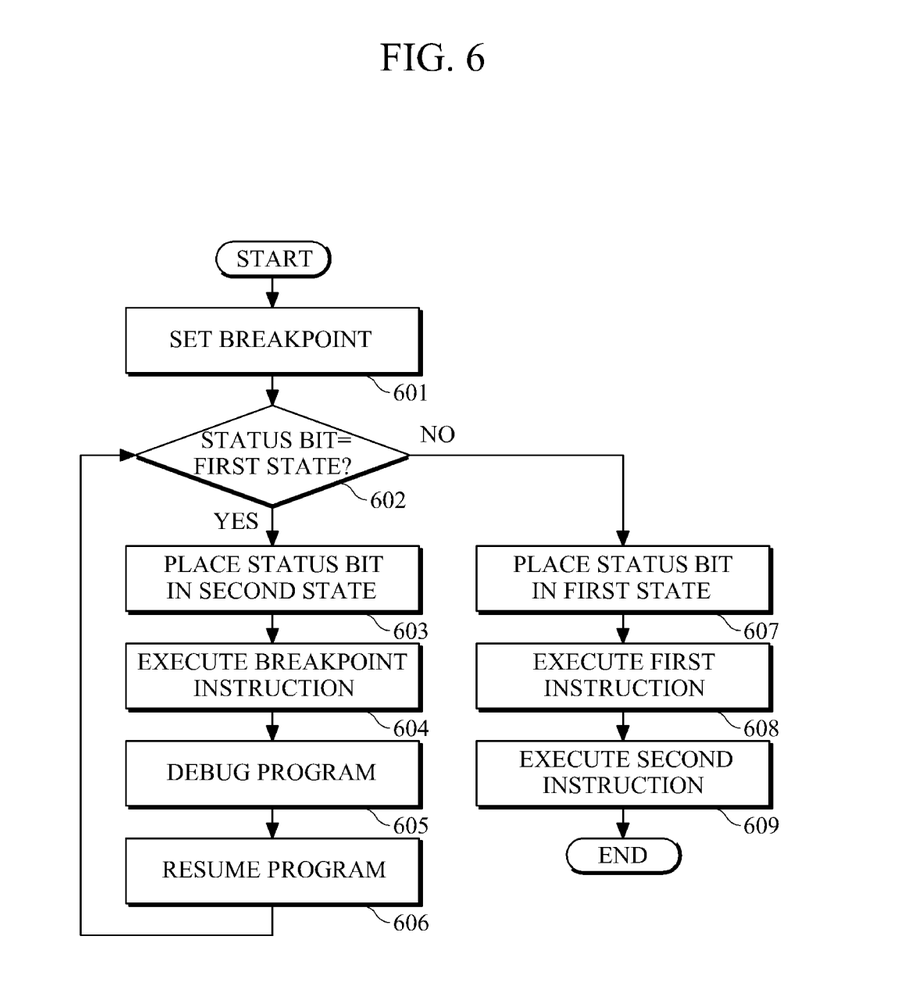
FIG. 6 is a flowchart illustrating an example of a debugging method.

FIG. 6 illustrates an example of a debugging method.

Referring to FIGS. 1, 4, and 6, in operation 601, a breakpoint may be set in a program. For example, the breakpoint setting unit 101 may store the first instruction 108 at the breakpoint 106 in the table 105, and may insert the breakpoint instruction 107, which may stop the program and may include current location information of the first instruction 108, into the original location of the first instruction 108. Thereafter, the breakpoint setting unit 101 may store the first instruction 108 in a first entry of the table 105, and may store a second instruction to be executed after the execution of the first instruction 108 in a second entry of the table 105.

Thereafter, in operation 602, in response to the breakpoint being encountered during the execution of the program, it may be determined whether a status bit is placed in a first state. For example, the controller 403 of the instruction execution unit 102 may determine whether the bit register 402 is set to a default value of 0.

In response to it being determined in operation 602 that the status bit is placed in the first state, in operation 603, the status bit may be switched to a second state; in operation 604, the breakpoint instruction 107 may be executed; and in operation 605, the debugging of the program may be performed. For example, the controller 403 of the instruction execution unit 102 may change the value of the bit register 402 from 0 to 1, may maintain the value of the program counter 401, and may control the executioner 404 to execute the breakpoint instruction 107.

In response to the debugging of the program being complete, in operation 606, the program may be resumed, and the method may return to operation 602.

On the other hand, in response to it being determined in operation 602 that the status bit is not placed in the first state, in operation 607, the status bit may be switched to the first state; in operation 608, the first instruction 108 may be executed; and in operation 609, the second instruction may be executed. For example, the controller 403 of the instruction execution unit 102 may change the value of the bit register 402 from 1 to 0, may change the value of the program counter 401 to indicate the first instruction 108 in the table 105 with reference to the address included in the breakpoint instruction 107, and may control the executioner 404 to execute the first instruction 108.

As described above, even if an instruction at a breakpoint is moved from its original location to another location, it may be possible to readily execute the instruction without the need to move the instruction back to its original location. Therefore, it may be possible to reduce unnecessary memory read/write operations and quickly switch from a debugging mode to a normal mode.

The processes, functions, methods and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the devices described herein may be incorporated in or used in conjunction with mobile devices such as a cellular phone, a personal digital assistant (PDA), a digital camera, a portable game console, and an MP3 player, a portable/personal multimedia player (PMP), a handheld e-book, a portable tablet and/or laptop computer (e.g. personal computer (PC)), a global positioning system (GPS) navigation, and devices such as a desktop computer (e.g. PC), a high definition television (HDTV), an optical disc player, a setup and/or set top box, and the like, consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. As an example, the example values of "0" and "1" may be interchanged or replaced, as appropriate. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A debugging apparatus, comprising:
a breakpoint setter configured to store a first instruction at a breakpoint in a table and insert a breakpoint instruction at the breakpoint, the breakpoint instruction configured to stop a program currently being executed and comprising current location information of the first instruction; and
an instruction executor configured to, in response to the breakpoint being encountered during the execution of the program,
execute the first instruction in response to a value of a status bit being a first state, and
execute the breakpoint instruction in response to the value of the status bit being a second state, wherein
the first instruction is distinct from the breakpoint instruction.

2. The debugging apparatus of claim 1, wherein the breakpoint setter is further configured to:
store the first instruction in a first entry of the table; and
store a second instruction, which is to be executed after the execution of the first instruction, in a second entry of the table.

3. The debugging apparatus of claim 2, wherein the instruction executor is further configured to:
execute the first instruction in the table; and
subsequently return an execution order to the second instruction, after the execution of the first instruction, with reference to the second entry.

4. The debugging apparatus of claim 1, wherein the instruction executor is further configured to:
in response to the execution of the breakpoint instruction, switch the status bit to the first state.

5. The debugging apparatus of claim 4, wherein the instruction executor is further configured to:
in response to the execution of the first instruction, switch the status bit to the second state, in response to the status bit being placed in the first state.

6. The debugging apparatus of claim 1, wherein the instruction executor comprises:
a program counter configured to store an execution location of the program;
a bit register configured to store the status bit therein; and
a controller configured to:
maintain a value of the program counter; or
change the value of the program counter to indicate the first instruction in the table, in response to the value of the program counter reaching an address of the breakpoint.

7. The debugging apparatus of claim 6, wherein the controller is further configured to change the status bit after the changing of the value of the program counter, to indicate the first instruction in the table.

8. A debugging apparatus, comprising:
a breakpoint setter configured to store a first instruction at a breakpoint in a table, and insert a breakpoint instruction at the breakpoint, the breakpoint instruction configured to stop a program currently being executed and comprising current location information of the first instruction;
a program counter configured to store an execution location of the program;
a bit register configured to store a status bit; and
a controller configured to
maintain the program counter to allow the breakpoint instruction to be executed and switch the status bit to a second state, in response to the program counter pointing to the breakpoint and the status bit being a first state, and
change the program counter to point to the location of the first instruction to allow the first instruction to be executed and switch the status bit to the first state, in response to the program counter pointing to the breakpoint and the status bit being the second state, wherein the first instruction is distinct from the breakpoint instruction.

9. The debugging apparatus of claim 8, wherein the breakpoint setter is further configured to store the first instruction and a second instruction together in the table, the second instruction to be executed after the execution of the first instruction.

10. The debugging apparatus of claim 9, wherein the controller is further configured to change the value of the program counter to indicate the second instruction, after the execution of the first instruction.

11. A debugging method, comprising:
storing a first instruction at a breakpoint in a table and inserting a breakpoint instruction into the breakpoint, the breakpoint instruction stopping a program currently being executed and comprising current location information of the first instruction;
in response to a status bit being placed in a first state, and a program counter pointing to the breakpoint:
switching the status bit to a second state;
maintaining the program counter; and
executing the breakpoint instruction; and
in response to the status bit being placed in the second state and the program counter pointing to the breakpoint:
switching the status bit to the first state;
changing the program counter to point to the location of the first instruction; and
executing the first instruction, wherein the first instruction is distinct from the breakpoint instruction.

12. The debugging method of claim 11, wherein inserting the breakpoint instruction comprises storing the first instruction and a second instruction together in the table, second instruction to be executed after the execution of the first instruction.

13. A non-transitory computer-readable information storage medium storing a program for implementing the method of claim 11.

14. A debugging method, comprising:
setting a breakpoint in a program;
in response to the breakpoint being encountered during the execution of the program, determining whether a status bit is placed in a first state;
in response to it being determined that the status bit is placed in the first state:
switching the status bit to a second state;
executing the breakpoint instruction; and
performing debugging of the program, wherein the breakpoint instruction is distinct from a first instruction stored at the breakpoint.

15. The debugging method of claim 14, further comprising, in response to the debugging of the program being complete:
resuming the program; and
determining whether the status bit is placed in the first state.

16. The debugging method of claim 14, further comprising, in response to it being determined that the status bit is not placed in the first state:
    switching the status bit to the first state;
    executing the first instruction; and
    executing the second instruction.

17. A non-transitory computer-readable information storage medium storing a program for implementing the method of claim 14.

18. A debugging apparatus, comprising:
    a breakpoint setter configured to set a breakpoint in a program;
    an instruction executor configured to:
        in response to the breakpoint being encountered during the execution of the program, determine whether a status bit is placed in a first state; and
        in response to it being determined that the status bit is placed in the first state:
            switch the status bit to a second state;
            execute the breakpoint instruction; and
            perform debugging of the program, wherein the breakpoint instruction is distinct from a first instruction stored at the breakpoint.

19. The debugging apparatus of claim 18, wherein, in response to the debugging of the program being complete, the instruction executor is further configured to:
    resume the program; and
    determine whether the status bit is placed in the first state.

20. The debugging apparatus of claim 18, wherein in response to it being determined that the status bit is not placed in the first state, the instruction executor is further configured to:
    switch the status bit to the first state;
    execute the first instruction; and
    execute the second instruction.

* * * * *